US010694225B2

(12) United States Patent
Sanghavi et al.

(10) Patent No.: US 10,694,225 B2
(45) Date of Patent: *Jun. 23, 2020

(54) CUSTOMIZING SUPPLEMENTAL CONTENT DELIVERY

(71) Applicant: Apple Inc., Cupertino, CA (US)

(72) Inventors: Mehul K. Sanghavi, Sunnyvale, CA (US); Sagar A. Joshi, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/132,623

(22) Filed: Sep. 17, 2018

(65) Prior Publication Data
US 2019/0058904 A1    Feb. 21, 2019

Related U.S. Application Data

(63) Continuation of application No. 15/007,069, filed on Jan. 26, 2016, now Pat. No. 10,085,048.
(Continued)

(51) Int. Cl.
| | | |
|---|---|---|
| *H04N 21/234* | (2011.01) | |
| *H04N 21/258* | (2011.01) | |
| *H04N 21/437* | (2011.01) | |
| *H04N 21/44* | (2011.01) | |
| *H04N 21/4784* | (2011.01) | |
| *H04N 21/475* | (2011.01) | |
| *H04N 21/454* | (2011.01) | |
| *H04N 21/81* | (2011.01) | |
| *H04N 21/2668* | (2011.01) | |
| *H04N 21/442* | (2011.01) | |
| *H04N 21/4627* | (2011.01) | |
| *G06Q 30/02* | (2012.01) | |

(Continued)

(52) U.S. Cl.
CPC ....... *H04N 21/23424* (2013.01); *G06F 21/10* (2013.01); *G06Q 30/0241* (2013.01); *G06Q 30/0601* (2013.01); *H04N 21/25891* (2013.01); *H04N 21/2668* (2013.01); *H04N 21/437* (2013.01); *H04N 21/44008* (2013.01); *H04N 21/44204* (2013.01); *H04N 21/454* (2013.01); *H04N 21/4627* (2013.01); *H04N 21/4755* (2013.01); *H04N 21/4784* (2013.01); *H04N 21/812* (2013.01); *G06F 2221/2135* (2013.01)

(58) Field of Classification Search
CPC ....... H04N 21/23424; H04N 21/25891; H04N 21/2668; H04N 21/437; H04N 21/44008; H04N 21/44204; H04N 21/454; H04N 21/4627; H04N 21/4755; H04N 21/4784; H04N 21/812; H04N 21/2135; G06F 21/10; G06Q 30/0601; G06Q 30/0241
See application file for complete search history.

(56) References Cited

U.S. PATENT DOCUMENTS

2003/0149621 A1   8/2003  Shteyn
2004/0133909 A1 * 7/2004  Ma ..................... G06Q 30/0207
                                           725/34
(Continued)

*Primary Examiner* — Chenea Davis
(74) *Attorney, Agent, or Firm* — Polsinelli PC

(57) ABSTRACT

Determining that a client device is in a supplemental content restriction mode, creating a shell of a supplemental content item, delivering the shell of the supplemental content item to the client device, and reporting a presentation event of a supplemental content item being served to the client device.

27 Claims, 15 Drawing Sheets

Related U.S. Application Data

(60) Provisional application No. 62/172,156, filed on Jun. 7, 2015.

(51) Int. Cl.
*G06Q 30/06* (2012.01)
*G06F 21/10* (2013.01)

(56) References Cited

U.S. PATENT DOCUMENTS

| | | |
|---|---|---|
| 2008/0242221 A1 | 10/2008 | Shapiro et al. |
| 2009/0216621 A1* | 8/2009 | Anderson .............. G06Q 30/02 705/14.7 |
| 2009/0313546 A1 | 12/2009 | Katpelly |
| 2010/0057576 A1* | 3/2010 | Brodersen .......... G06Q 30/0273 705/14.69 |
| 2014/0223475 A1 | 8/2014 | McIntire |
| 2015/0046267 A1 | 2/2015 | MacTiernan et al. |
| 2015/0189347 A1 | 7/2015 | Oztaskent et al. |
| 2015/0319122 A1 | 11/2015 | Lockhart et al. |
| 2015/0319505 A1 | 11/2015 | Patadia |
| 2016/0292715 A1 | 10/2016 | Kang |
| 2016/0323244 A1* | 11/2016 | Carncross ............. H04L 63/029 |

\* cited by examiner

CUSTOMIZING SUPPLEMENTAL CONTENT DELIVERY

CROSS REFERENCE TO RELATED APPLICATIONS

This application is a continuation of U.S. application Ser. No. 15/007,069 filed in Jan. 26, 2016, which in turn claims priority to U.S. provisional application No. 62/172,156, filed on Jun. 7, 2015, both of which are expressly incorporated by reference herein in their entirety.

BACKGROUND

In known media distribution systems, media content can be delivered along with supplemental content. In some cases, the manner in which supplemental content is delivered is determined by the media distribution system. However, in some cases a user can subscribe to a service for customizing the amount of supplemental content that is delivered along with media content. Although many users do not choose to commit to a subscription model, the same users sometimes want to customize the amount of supplemental content that they receive. What is needed is a media consumption mode that allows a user to customize the amount of supplemental content they receive along with content received from a media distribution system without requiring the user to subscribe to a service.

SUMMARY

The present technology involves determining that a client device is in one of a plurality of supplemental content restriction modes and delivering media items and a shell of supplemental content to the client device based on the restriction mode.

A media streaming server can be configured to stream media items and supplemental content items to a client device. The media streaming server can determine that a client device is associated with a user account that is subscribed to stream media in a supplemental content-free media streaming mode. When a client device is not associated with a user account that is subscribed to stream media in a supplemental content-free mode, the media streaming server can provide streaming media to the client device in a non-restriction mode along with supplemental content. Some embodiments of the present technology can involve one or more restriction modes for suspending the delivery of supplemental content, reduce the frequency of supplemental content, reduce the duration of supplemental content, allow the user to bid on slots in the stream that would otherwise be filled with supplemental content, etc.

The client device can store one or more flags indicating that a user has selected to operate a media streaming application in one or more restriction modes. When the client device sends a request for streaming media to the media streaming server, the media streaming server can detect a flag associated with a user account for the client device. Additionally, the client device can deliver the one or more flags to the media streaming server via the request for streaming media.

After detecting the flag, and after receiving one or more supplemental content items for inclusion in the stream of media to be delivered to the client device, the media streaming server can create a shell of the supplemental content item that identifies the supplemental content item and that is configured to not interrupt playback of the stream of media items. The shell of the supplemental content item can be added to a stream of media items and when a media player reaches the shell in the stream, the shell is detected without interrupting playback of the stream of media items at the client device. Additionally, the shell of the supplemental content item can be configured to cause the client device to report a presentation event of a supplemental content item by the client device when it is detected in the stream of media items.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a media consumption mode that allows a user to customize the amount of supplemental content they receive along with content requested from a media distribution system and the need to create a new media content type in the form of a shell that describes supplemental content that is foregone by a user being in a supplemental content restriction mode.

Figure 1:
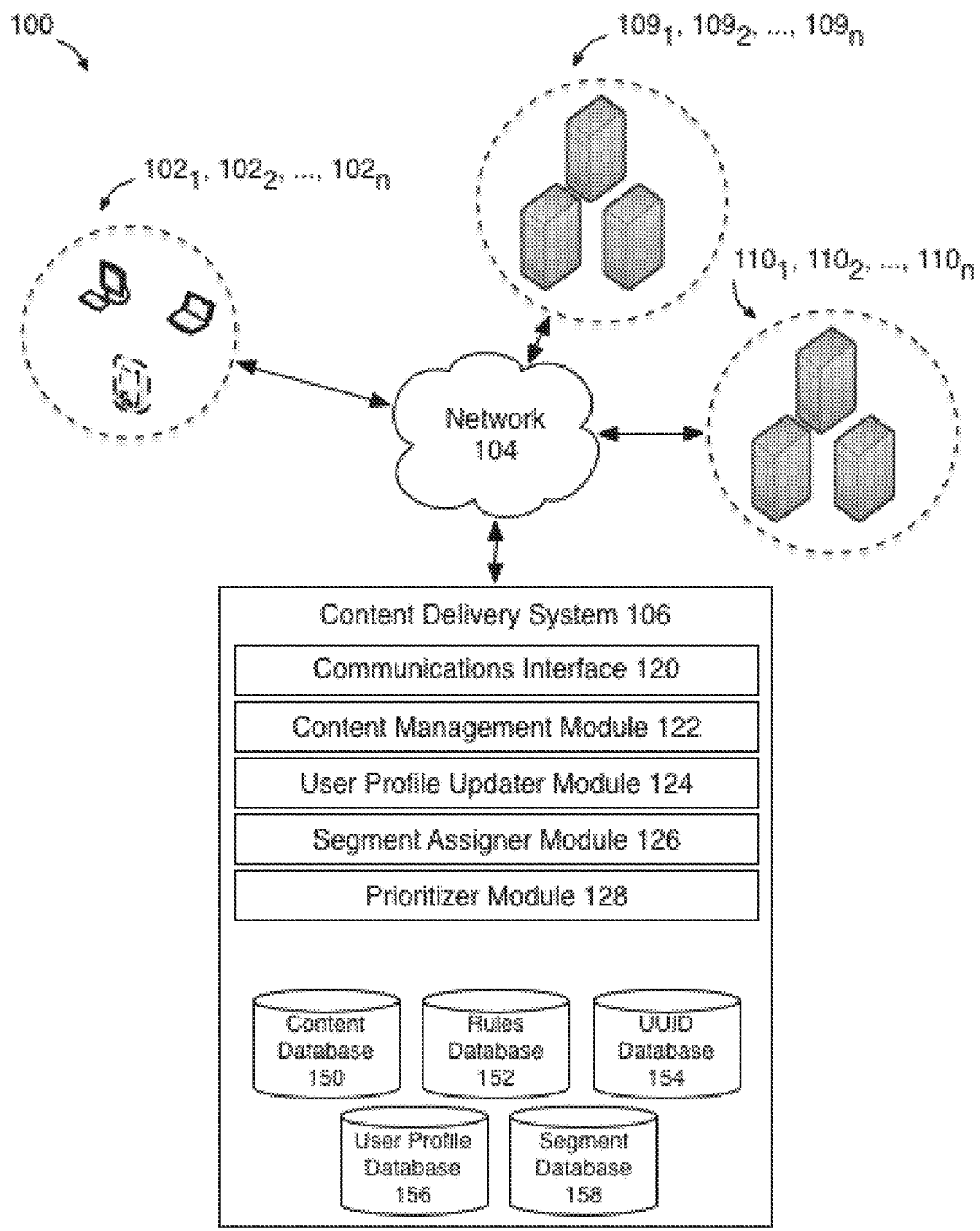
FIG. 1 illustrates an example of a system configuration according to some embodiments of the present technology.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, supplemental content can be delivered to user terminals $102_1$, $102_2$, . . . , $102_n$ (collectively "102") connected to a network 104 by direct and/or indirect communications with a content delivery system 106. User terminals 102 can be any network enabled client devices, such as desktop computers; mobile computers; handheld communications devices, e.g. mobile phones, smart phones, tablets; smart televisions; set-top boxes; and/or any other network enabled computing devices. Furthermore, content delivery system 106 can concurrently accept connections from and interact with multiple user terminals 102.

The content delivery system 106 can receive a request for electronic content, such as a web page, an application, a media item, etc., from one of user terminals 102. Thereafter, the content delivery system 106 can assemble a supplemental content package and transmit the assembled supplemental content page to the requesting one of user terminals 102. To facilitate communications with the user terminals 102 and/or any other device or component, the content delivery system 106 can include a communications interface 120.

The content delivery system 106 can include a content management module 122 to facilitate the generation of an assembled content package. Specifically, the content management module 122 can combine content from one or more primary content providers $109_1$, $109_2$, . . . , $109_n$ (collectively "109") and content from one or more secondary content providers $110_1$, $110_2$, . . . $110_n$ (collectively "110") to generate the assembled content package for the user terminals 102. For example, in the case of a web page being delivered to a requesting one of user terminals 102, the content management module 122 can assemble a content package by requesting the data for the web page from one of the primary content providers 109 maintaining the web page. For the supplemental content on the web page provided by the secondary content providers 110, the content management module 122 can request the appropriate data according to the arrangement between the primary and secondary content providers 109 and 110. Additionally, the content management module 122 can create content packages that contain content from a single content provider. That is, a content package can contain only primary content or a content package can contain only secondary content. However, the content package is not limited to the content from content providers 109 and 110. Rather, the content package can include other data generated at the content delivery system 106. In some embodiments, the content delivery system 106 can preselect the content package before a request is received.

An assembled content package can include text, graphics, audio, video, executable code, or any combination thereof. Further, an assembled content package can include supplemental content designed to inform or elicit a pre-defined response from the user.

Furthermore, the supplemental content can be dynamic supplemental content. That is supplemental content that varies over time or that varies based on user interaction. For example, dynamic supplemental content can include an interactive game. However, the various embodiments are not limited in this regard and the supplemental content can include static supplemental content that neither varies over time nor with user interaction. In the various embodiments, supplemental content in a content package can be static or dynamic and active or passive. A content package can include a combination of various types of supplemental content in a single content package.

In some cases, a content package can replace or update supplemental content in a content package already delivered to a user terminal. For example, a first content package can include an app that can be installed on the user terminal $102_i$. A subsequent content package can include one or more items of supplemental content that can be presented to a user of the user terminal $102_i$ while the user interacts with the app.

Although primary and secondary providers 109 and 110 are presented herein as separate entities, this is for illustrative purposes only. In some cases, the primary and the secondary content providers 109 and 110 can be the same entity. Thus, a single entity can provide both the primary and the secondary content.

The content management module 122 can be configured to request that content be sent directly from content providers 109 and 110. Alternatively, a cached arrangement can also be used to improve performance of the content delivery system 106 and improve overall user experience. That is, the content delivery system 106 can include a content database 150 for locally storing/caching content maintained by content providers 109 and 110. The data in the content database 150 can be refreshed or updated on a regular basis to ensure that the content in the database 150 is up to date at the time of a request from a user terminal $102_i$. However, in some cases, the content management module 122 can be configured to retrieve content directly from content providers 109 and 110 if the metadata associated with the data in the content database 150 appears to be outdated or corrupted.

As described above, content maintained by the content providers 109 and 110 can be combined according to a predefined arrangement between the two content providers, which can be embodied as a set of rules. In an arrangement where the content delivery system 106 assembles the content package from multiple content providers, the assembly rules can be stored in a rules database 152 in the content delivery system 106. The content management module 122 can be configured to assemble the content package for user terminals 102 based on these rules. The rules can specify how to select content from secondary content providers 110 and primary content providers 109 in response to a request from one of user terminals 102. For example, in the case of a web page maintained by one of primary content providers 109 and including supplemental content, the rules database 152 can specify rules for selecting one of the secondary providers 110. The rules can also specify how to select specific content from the selected one of secondary providers 110 to be combined with the content provided by one of primary providers 109. In some cases, an item of primary content, such as an app or other media object, can have one or more associated attributes. For example, an app can have one or more associated genre attributes, e.g. travel, sports, education, etc. A rule can be based at least in part on the primary content attributes. Once assembled, the assembled content package can be sent to a requesting one of user terminals 102.

Additionally, rules for combining primary and secondary content can be based on user characteristics known about the user and one aspect of the present technology is the gathering and use of data available from various sources to improve the delivery to users of supplemental content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

As explained above, rules for combining primary and secondary content can be based on user characteristics known about the user. In particular, in some cases, supplemental content can be selected based on the characteristics of the requesting user(s). As used herein, the term "user characteristics" refers to the characteristics of a particular user associated with one or more of user terminals 102. User characteristics can include channel characteristics, demographic characteristics, behavioral characteristics, and spatial-temporal characteristics. Channel characteristics can define the specific delivery channel being used to deliver a content package to a user. For example, channel characteristics can include a type of electronic content, a type of device or user terminal, a carrier or network provider, or any other characteristic that defines a specific delivery channel for the content package. Spatial-temporal characteristics can define a location, a location zone, a date, a time, or any other characteristic that defines a geographic location and/or a time for delivery of the content package. Demographic characteristics can define characteristics of the users targeted by the content or associated with the content. For example, demographic characteristics can include age, income, ethnicity, gender, occupation, or any other user characteristics. Behavioral characteristics can define user behaviors for one or more different types of content, separately or in combination with any other user characteristics. That is, different behavioral characteristics may be associated with different channel, demographic, or spatial-temporal characteristics. User characteristics can also include characteristics descriptive of a user's state of mind including characteristics indicative of how likely a user is to click on or convert an item of supplemental content if it were displayed to the user. User characteristics can be learned directly or derived indirectly from a variety of sources. In some embodiments, the user characteristic values can be collected from one or more databases. For example, if the user is registered with an online media service, such as the ITUNES store maintained by Apple Inc. of Cupertino, Calif., the collected data could include the user's registration information. Such data can provide values for declared user characteristics. Furthermore, the content delivery system 106 can be configured to learn of or derive user characteristics from any number of other information sources. For example, in some configurations, the content delivery system 106 can derive or infer one or more user characteristic values from user characteristic values already known about the user.

In some embodiments, the interactive content can be associated with one or more targeted segments. A targeted segment can be viewed as defining a space or region in k-dimensional space, where each of the k dimensions is associated with one of a plurality of user characteristics. In the various embodiments, the k dimensions can include both orthogonal and non-orthogonal dimensions. That is, some of the k dimensions can overlap or can be related in some aspect.

In the various embodiments, the content delivery system 106 can also include a unique user identifier (UUID) database 154 that can be used for managing sessions with the various user terminal devices 102. The UUID database 154 can be used with a variety of session management techniques. For example, the content delivery system 106 can implement an HTTP cookie or any other conventional session management method (e.g., IP address tracking, URL query strings, hidden form fields, window name tracking, authentication methods, and local shared objects) for user terminals 102 connected to content delivery system 106 via a substantially persistent network session. However, other methods can be used as well. For example, in the case of handheld communications devices, e.g. mobile phones, smart phones, tablets, or other types of user terminals connecting using multiple or non-persistent network sessions, multiple requests for content from such devices may be assigned to a same entry in the UUID database 154. The content delivery system 106 can analyze the attributes of requesting devices to determine whether such requests can be attributed to the same device. Such attributes can include device or group-specific attributes.

In some embodiments, the content delivery system 106 can include a user-profile database 156. The user-profile database 156 can, at least in part, be constructed based on declared user characteristics related to one or more users. In some cases, the user-profile database may contain inferred or derived user characteristic values. The user-profile database 156 can be updated using a user-profile-updater module 124. In some embodiments, the user-profile-updater module 124 can be configured to add additional profile data, update profile data, fill in missing profile data, or infer user characteristic values from declared data.

The user-profile-updater module 124 can also be configured to maintain the user profile database 156 to include only more recently acquired data or to re-derive any inferred characteristics in order to ensure that the user profile is an accurate reflection of the current state of the user (location, state of mind, behaviors, demographics, etc. can change rapidly). For example, the user-profile-updater module 124 can be configured to maintain the user profile database 156 to include only data from the last two to three months. However, the user-profile-updater module 124 can be configured to adjust the data in the user profile database 156 to cover any span of time. In some instances the user-profile-updater module 124 can update the profile database 156 in real-time. Alternatively, the user-profile-updater module 124 can be configured to set an expiration period on a subset of the data in the user profile database 156. For example, a policy can specify that user declared data is maintained as long as the user account is active, but user characteristic values based on location information expire after a specified period of time. In some cases, a user can set the expiration period. In some instances, the user-profile-updater module 124 can update the user profile database 156 at least every week, or every day. In some cases, the content delivery system 106 can receive a direct request to update one or more user profiles. The update request can come directly from the user's device or any other device capable of communicating with the content delivery system 106, such as other content delivery networks or websites. In some cases, the content delivery system 106 can receive an indirect request to update one or more user profiles. An indirect request can be the result of receiving new user characteristic values. An update request can occur at any time.

In some embodiments, the content delivery system 106 can include a segment database 158 that is used to aid in selecting supplemental content to target to users. The segment database 158 can store defined segments and associations between the segments and users and/or supplemental content that should be targeted to users associated with the segments. As described above, a targeted segment can be defined based on one or more user characteristics or derivatives thereof and can be associated with one or more items of supplemental content. Additionally, a targeted segment can be associated with one or more users. In some embodiments, by associating a targeted segment with both a user and an item of supplemental content, the delivery system can match supplemental content with users. In some embodiments, the content delivery system 106 can update the segment database 158 to add newly defined targeted segments or to delete targeted segments.

In some cases a targeted segment can be as simple as a single user characteristic identifier and a single user characteristic value. For example, the common demographic identifiers of gender, age, occupation, or income can each be used in defining corresponding targeted segments. A characteristic value can also be assigned to the identifier. For example, the values of male, 19, and student can be assigned to the user characteristics of gender, age, and occupation, respectively. However, more complex targeted segments can also be defined that consist of one or more identifiers with one or more values associated with each identifier. For example, a targeted segment can be defined to target a user with the following characteristics: gender, male; age, 19-24; location, Northern California or New York City. Additional exemplary segments are described throughout this disclosure. Furthermore, targeted segments can correspond to one or more segments that content providers are likely to easily understand and thus can quickly identify as being relevant to their content. Additionally, in some embodiments, content providers 109 and 110 can define a custom targeted segment.

In some embodiments, the content delivery system 106 can provide a segment assigner module 126. The segment assigner module 126 can apply a set of user characteristics associated with a user (including segments to which a user has been previously assigned) to assign the user to one or more targeted segments. The assigner module 126 can obtain the set of user characteristic values from the user profile database 154 and/or from the user's activities during the current session. The segment assigner module 126 can assign a user to one or more defined targeted segments in the segment database 158, or alternatively, a user can be assigned to a custom targeted segment defined to meet specific goals of a content provider.

Based on the assigned segments, the user profile database 156 can be updated to reflect the segment assignments. Additionally, the content delivery system 106 can use the segment assignments to select targeted content. In some cases, the user profile data in the user profile database 156 can change over time so the segment assigner module 126 can be configured to periodically update the segment assignments in the user profile database 156. The segment assignment update can be triggered at specified intervals, upon detection of a change in the user profile database 156, and/or upon detection of a specified activity in the content delivery system 106.

In some embodiments, the content delivery system 106 can provide a prioritizer module 128. The prioritizer module 128 can perform a variety of prioritizing tasks based on the configuration of the content delivery system 106. In some configurations, the prioritizer module 128 can prioritize the targeted segments assigned to a user. The prioritization can be influenced by a number of factors, which can include the user's context, a content provider's campaign goals, and/or the content that is currently available for display to the user. A request to prioritize the targeted segments can be explicit or implicit and can be made by any component of the system 100. For example, a secondary content provider 110 can explicitly request that the content delivery system 106 prioritize the targeted segments or the request can be implicit as part of a request for a content package. The resulting prioritized list can be provided, for example, to the content management module 122, which can then use the information to assemble and deliver a content package. Additionally, the prioritized list can be stored, for example in the user profile, for later use.

While the content delivery system 106 is presented with specific components, it should be understood by one skilled in the art, that the architectural configuration of system 106 is simply one possible configuration and that other configurations with more or less components are also possible.

Figure 2:
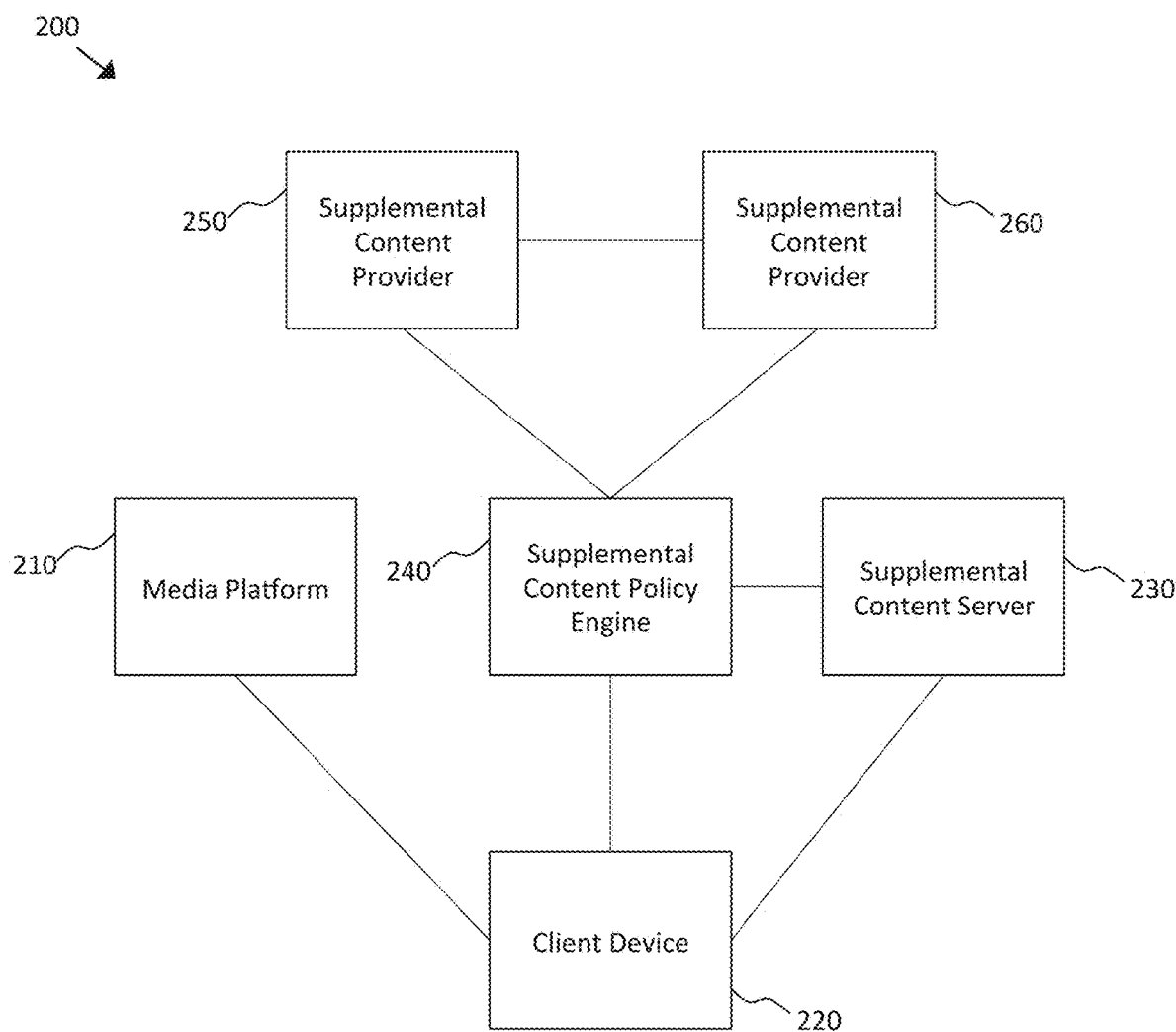
FIG. 2 illustrates a system for providing a mode that allows a user to customize the amount of supplemental content they receive along with media content according to some embodiments of the present technology.

FIG. 2 illustrates a system 200 for providing a mode that allows a user to customize the amount of supplemental content they receive along with media content according to some embodiments of the present technology. The system 200 includes a media platform 210 that delivers media content to a client device 220 based on a request from the client device 220. Additionally, the system 200 includes a supplemental content server 230 that delivers supplemental content to the client device 220 and a supplemental content policy engine 240 that chooses the supplemental content from one or more supplemental content provider 250, 260. For example, the client device 220 can provide the supplemental content policy engine 240 a context in which the client device 220 is consuming media (e.g. listening to a top 40 radio station, time of day, type of application being run, etc.) and the supplemental content policy engine 240 can select supplemental content based on the context.

The client device 220 can also be associated with a user profile for a user of the client device. The user profile can provide an indication about whether the user subscribes to a subscription service that allows the user to customize the amount of supplemental content that they are delivered along with the requested media content. For example, in some cases, the subscription service limits or completely avoids a client device from receiving any supplemental content or allows the user to specify whether they do not want to receive any supplemental content.

In cases where a user subscribes to the subscription service, a flag is saved at the client device. Also, the supplemental content server 230 can receive, prior to delivering supplemental content, a flag from the client device 220 that indicates that the user subscribes to the subscription service. In some embodiments, the client device 220 sends a flag to the supplemental content server 230 when the client device 220 opens an application that can receive supplemental content. The flag can be a file configured to deliver information about supplemental content modes, can be a metadata tag, or can be any other type or part of a signal that this sent from the client device 220 to the supplemental content server 230.

According to some embodiments of the present technology, one or more temporary restriction modes can be selected by user of a client device to temporally allow the user to customize the amount of supplemental content that they are delivered along with the requested media content. For example, the client device can store one of more flags that indicate to the media platform 210, the supplemental content policy engine 240, and/or the supplemental content server 230 that the user selected to enter one or more restriction mode including a temporary supplemental content restriction mode, a bidding mode, etc.

As explained in greater detail below, one restriction mode can involve a user selecting a period of time that they want access to supplemental content customization. For example, a user can specify a monetary amount that they are willing to be charged for the option of customizing the supplemental content that they receive. As explained below, the supplemental content can be associated with a reward amount and the user's client device can operate in the restriction mode until the reward amounts of supplemental content that has been foregone reaches the amount specified by the user. Similarly, the user can specify a number of supplemental content slots within a stream of media that they want to have the ability to customize. In the bidding mode, the user can be provided the opportunity to outright purchase the content slots that would otherwise be dedicated to supplemental content to avoid the need for having supplemental content to sponsor the media content. Although specific examples of supplemental content customization and specific example of restriction modes are disclosed explicitly, the those with ordinary skill in the art having the benefit of the disclosure will recognize that a wide rage of supplemental content restriction modes can be utilized and a client device could store flags for any number and/or types of modes.

FIGS. 3A-3D illustrates examples of user interfaces that allow a user to enter one or more modes that allows the user to customize the amount of supplemental content that they are delivered according to some embodiments of the present technology.

Figure 3A:
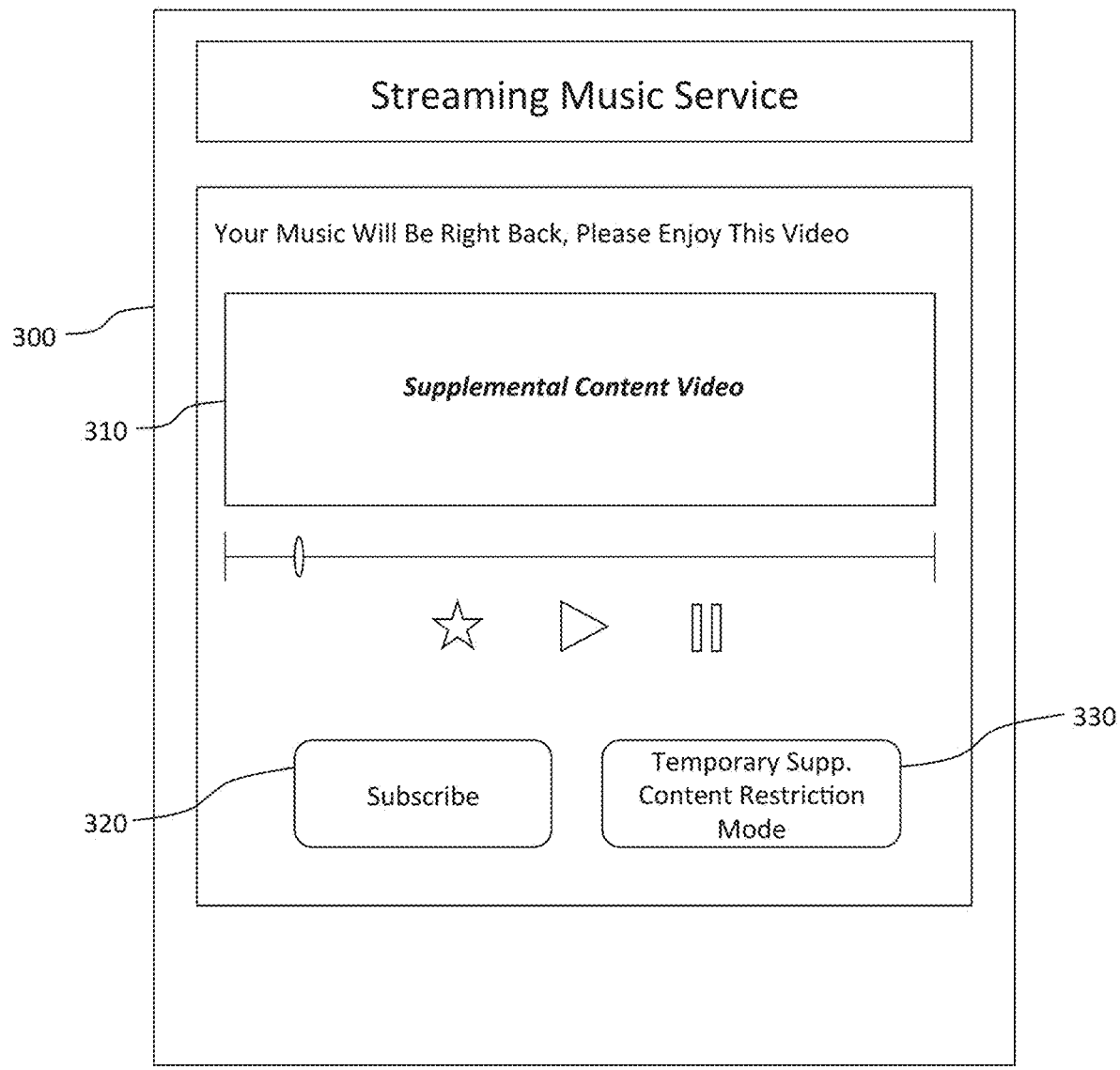
FIGS. 3A-3D illustrates examples of user interfaces that allow a user to enter one or more modes that allows the user to customize the amount of supplemental content that they are delivered according to some embodiments of the present technology.

FIG. 3A illustrates an example of a user interface 300 for a streaming music service application at a client device that involves the client device receiving a stream of media items delivered from a media platform, such as media platform 210 in FIG. 2, and performing playback of the media items. As shown in FIG. 3A, a supplemental content item 310 can also be delivered into the stream from a supplemental content server, such as supplemental content server 230 in FIG. 2. In some cases, a user can choose to customize how supplemental content is presented at the client device.

For example, the user interface 300 can include a subscribe button 320 that allows a user to pay a subscription fee to join a subscription service. The subscription service can offer a user a number of benefits including the ability to customize how supplemental content is inserted into the streaming music. Additionally, for users who only want to have the ability to customize how supplemental content is delivered on a temporary basis, the user interface 300 can allow the user to select additional options with an additional button 330 for customizing supplemental content.

Figure 3B:
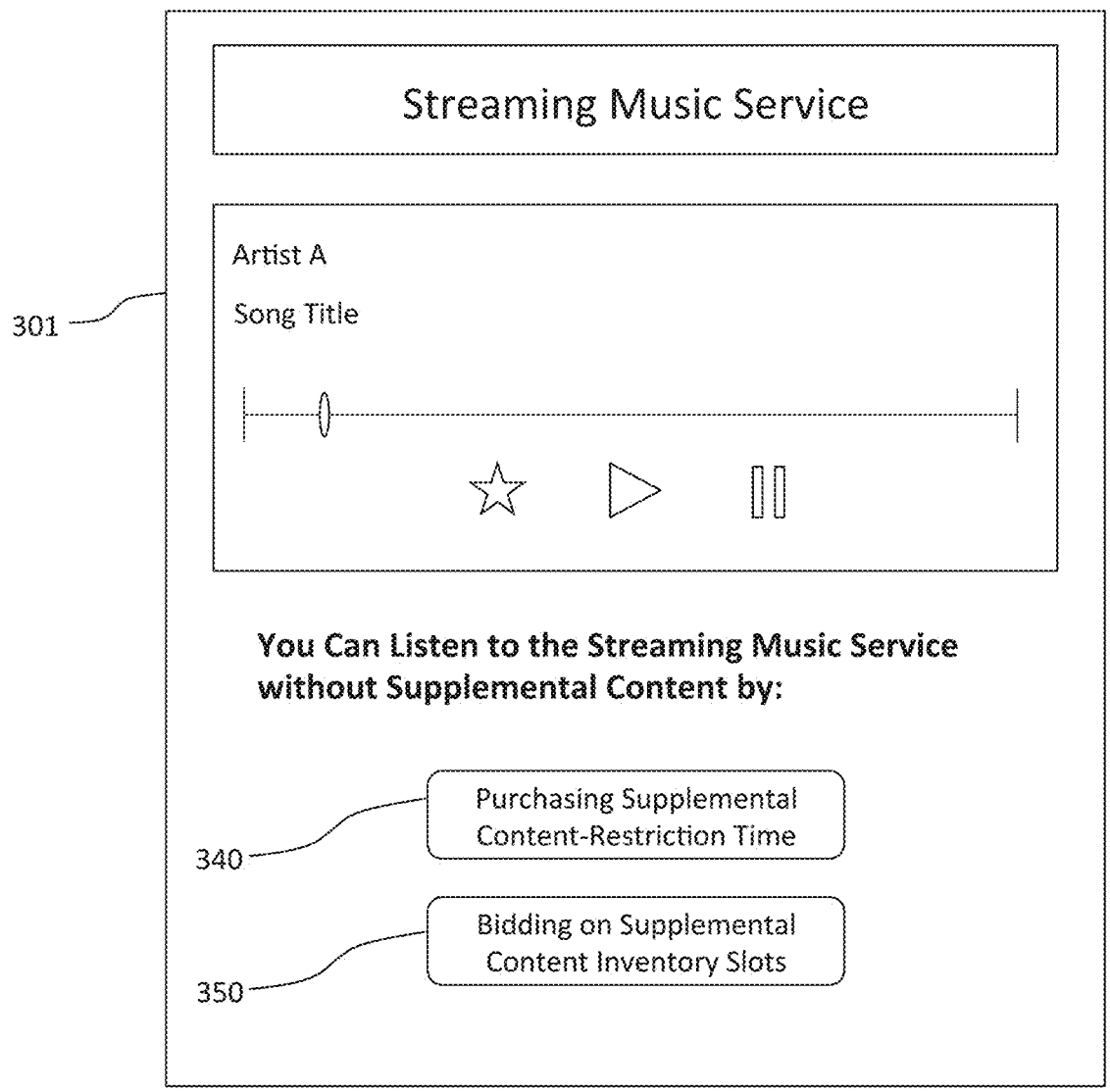

Pressing button 330 can cause the user interface 300 to show options for temporarily giving a user the control to customize how supplemental content is delivered. For example, as shown in FIG. 3B, selection of button 330 can cause the user interface 300 to provide two buttons 340, 350 for selecting supplemental content customization options. Button 340 allows a user to specify that the user wants to purchase a block of time during which the user can customize how supplemental content is delivered to the user. Button 350 allows a user to specify that the user wants to bid on inventory slots in the music stream that could otherwise be granted to supplemental content providers and filled will supplemental content.

Figure 3C:
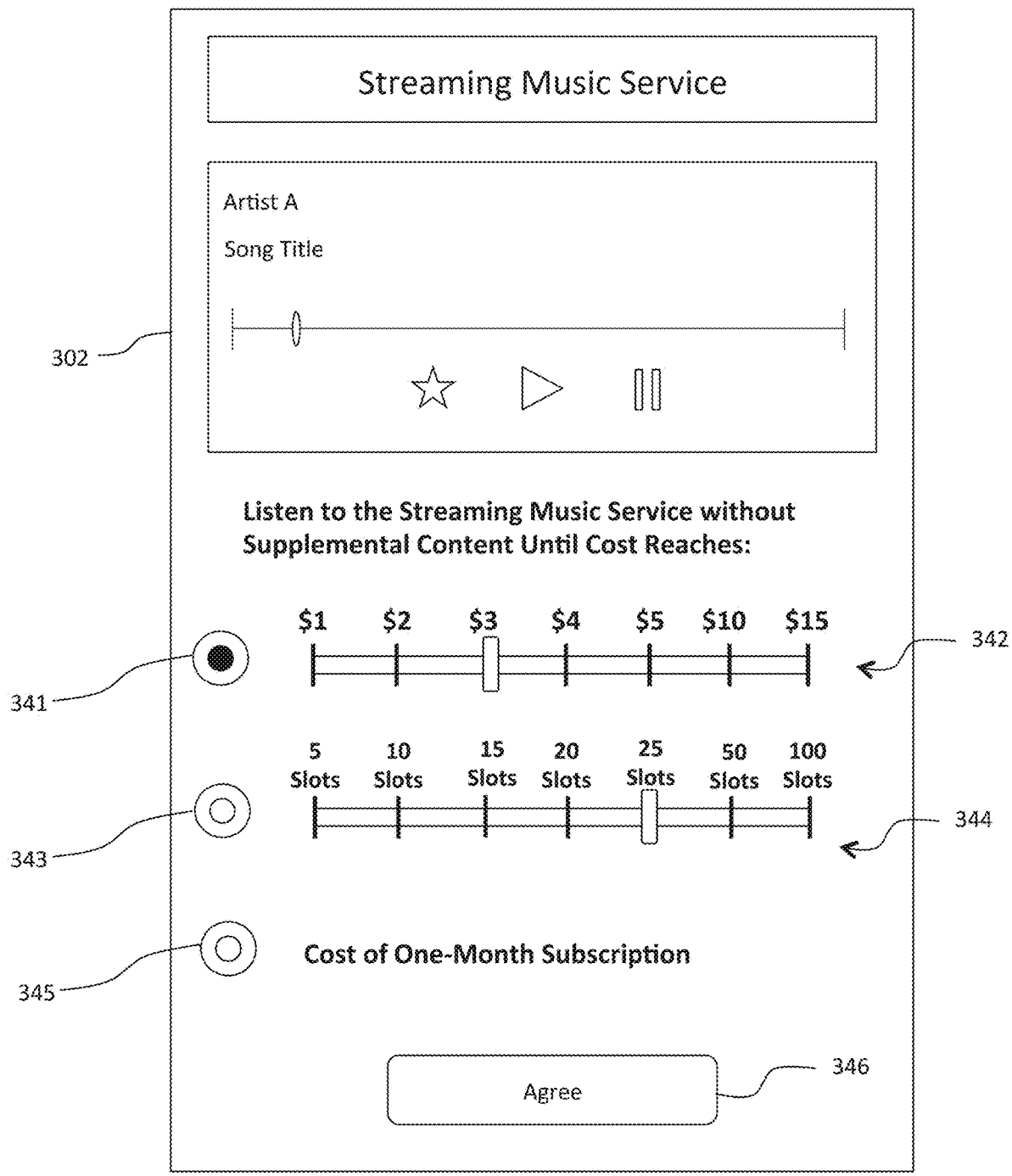

As shown in FIG. 3C, when the user presses the button 340, the user interface 300 displays a number of radio buttons 341, 343, 345 listing options for defining a period of time in which they are not provided with supplemental content. First, a radio button 341 can be selected to adjust a slider 342 that tunes a cost that the user is willing to pay for a time block of music streaming without supplemental content being inserted therein. Similarly, a radio button 343 can be selected to adjust a slider 344 that tunes a number of slots in the music stream that the user is willing to pay for to avoid supplemental content being inserted therein. Also, the radio button 345 can be selected to specify that the user is willing to pay for the cost of a one-month subscription to the subscription service to avoid supplemental content being inserted in the music stream. Once the user selects a desired option, the user can click the button 346 to agree.

Figure 3D:
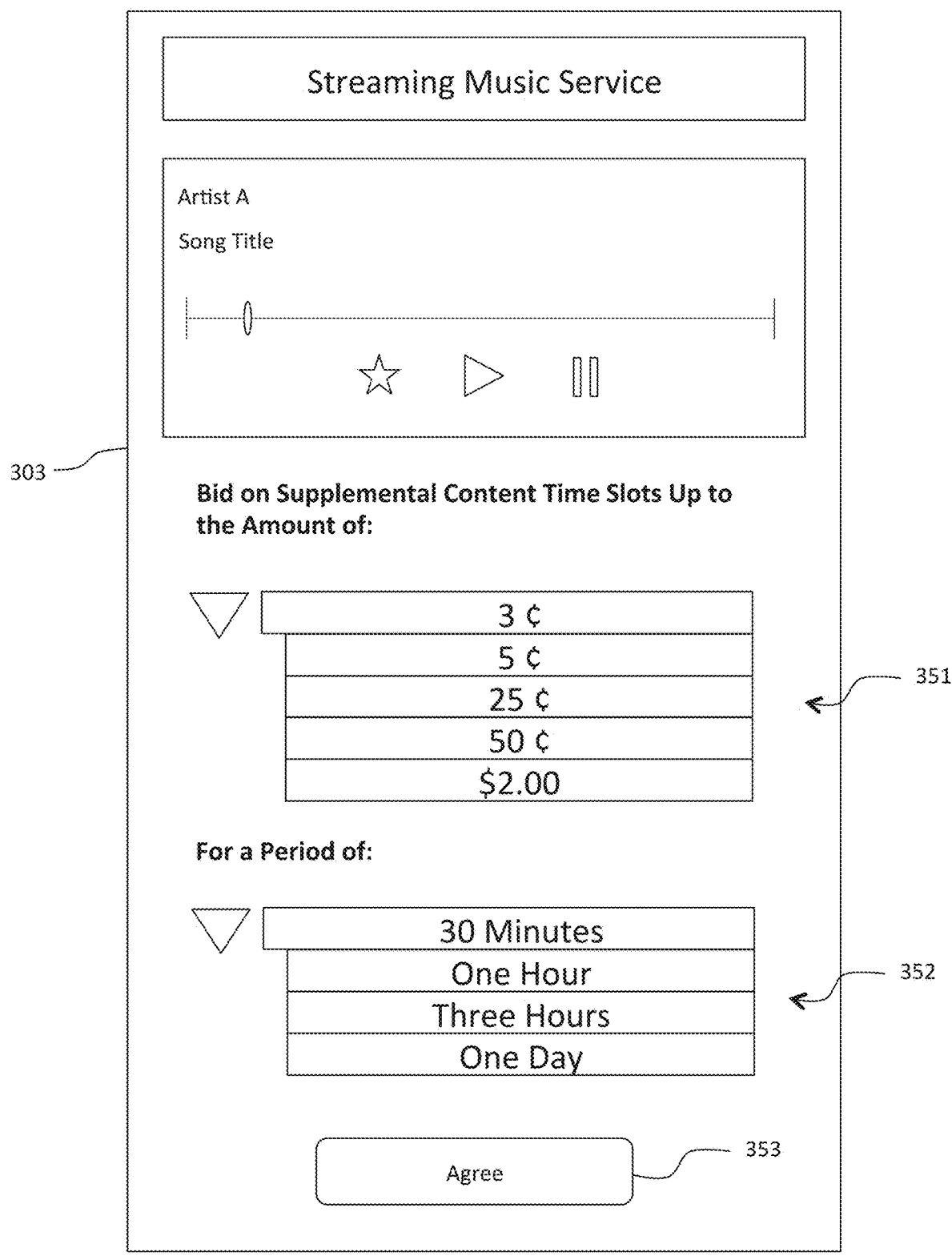

As shown in FIG. 3D, when the user presses the button 350 from FIG. 3B, the user interface 300 displays drop down menus 351, 352 that provide a user with the ability to specify how much they are willing to pay for a slot in the media streaming feed and for which period of time. This is illustrated in FIG. 3D. Once the user selects a desired option, the user can click the button 353 to agree.

Figure 4A:
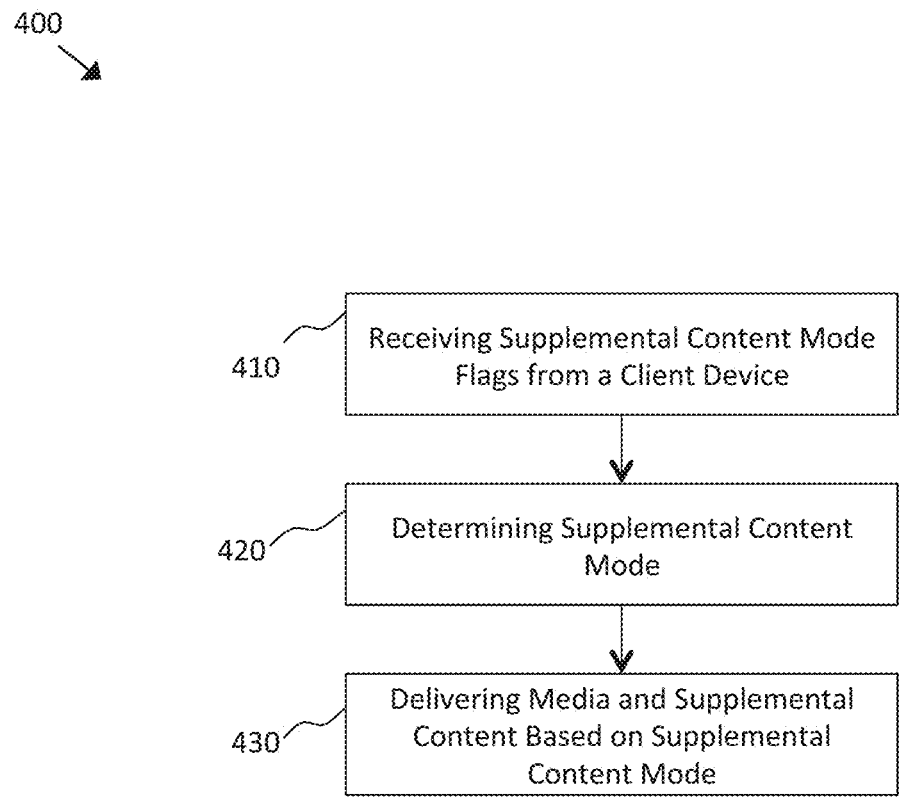
FIG. 4A illustrates of method of determining how to deliver media content and supplemental content to a client device according to some embodiments of the present technology.

FIG. 4A illustrates of method 400 of determining how to deliver media content and supplemental content to a client device according to some embodiments of the present technology. The method 400 involves a supplemental content server receiving, from a client device 410, flags to determine a supplemental content mode that the client device is operating in. The supplemental content server can determine when the client device is operating a default mode, a mode that indicates that the user subscribe to a subscription service that allows the user to customize the amount of supplemental content that they are delivered, a mode that indicates that the user selected to enter a temporary supplemental content restriction mode, or a mode that indicates that the user selected a bidding mode to obtain content slots that would otherwise be dedicated to supplemental content.

Next, the method 400 involves determining, based on the flags, the supplemental content mode the client device is operating in 420 and delivering media content and supplemental content based on the supplemental content mode 430. Types of supplemental content modes can include a non-restrictive mode, and one or more restriction modes including a subscription-based supplemental content restriction mode, a temporary supplemental content restriction mode, a supplemental content slot bidding mode, etc.

In some cases, a supplemental content server and/or a supplemental content client on a mobile device can detect that a client device is in a supplemental content restriction mode and, in response, create a shell of a supplemental content item.

The shell of the supplemental content item can identify the supplemental content item, but does not interrupt playback of the stream of media items. The shell of the supplemental content item can be added to a stream of media items and when the stream reaches the shell, the shell is detected without interrupting playback of the stream of media items at the client device. Additionally, the shell of the supplemental content item can be configured to cause the client device to report a presentation event of a supplemental content item by the client device when it is detected in the stream of media items (despite the supplemental content item not actually be presented).

Figure 7A:
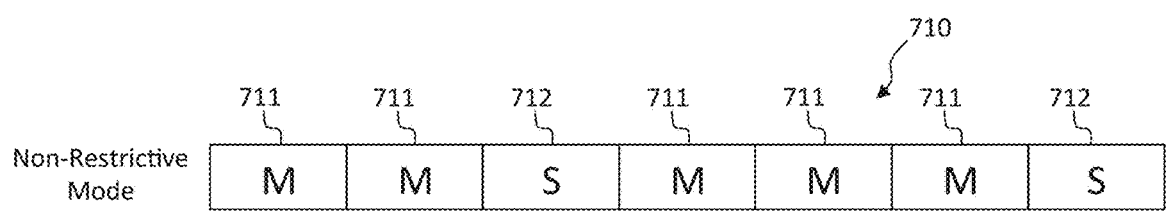
FIGS. 7A-7C illustrate example representations of streams of media items and supplemental content according to some embodiments of the present technology.
Figure 7B:
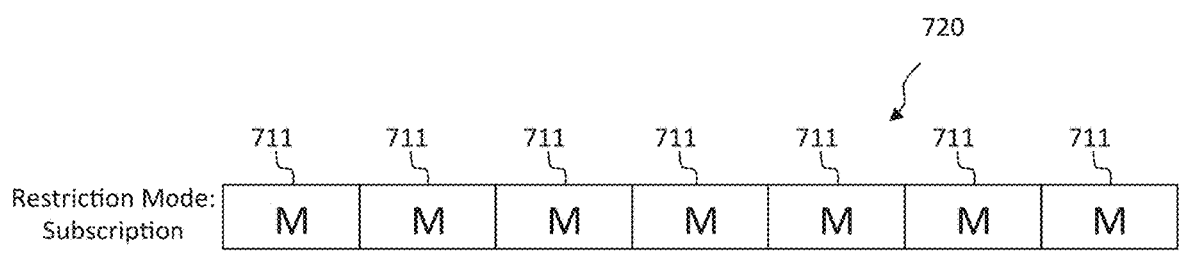
Figure 7C:
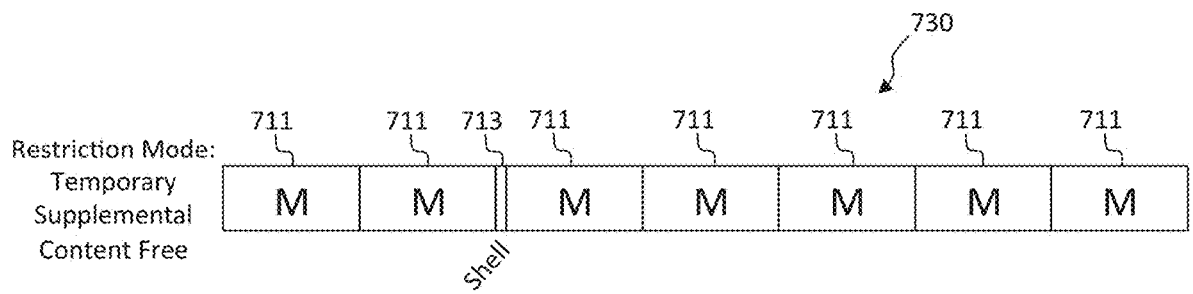

FIGS. 7A-7C illustrate example representations of streams of media items and supplemental content items according to some embodiments of the present technology. FIG. 7A illustrates a representation of a stream 710 of content that can be delivered to a media application on a client device. The stream 710 shown in FIG. 7A is delivered in a non-restrictive mode meaning that stream 710 includes media items 711 and supplemental content items 712. FIG. 7B illustrates a representation of a stream 720 of content that can be delivered to a media application on a client device. The stream 720 shown in FIG. 7B is delivered in subscription restriction mode meaning that stream 720 only includes media items 711. FIG. 7C illustrates a representation of a stream 730 of content that can be delivered to a media application on a client device. The stream 730 shown in FIG. 7C is delivered in a temporary supplemental content-free restriction mode meaning that stream 730 includes media items 731 and shell(s) 732 of supplemental content which do not interrupt playback of the media items 731. Rather, when the stream reaches the shell(s) 732 of the supplemental content items, the shell(s) are detected without interrupting playback of the stream of media items at the client device and, when detected, cause the client device to report a presentation event of a supplemental content item by the client device.

Figure 4B:
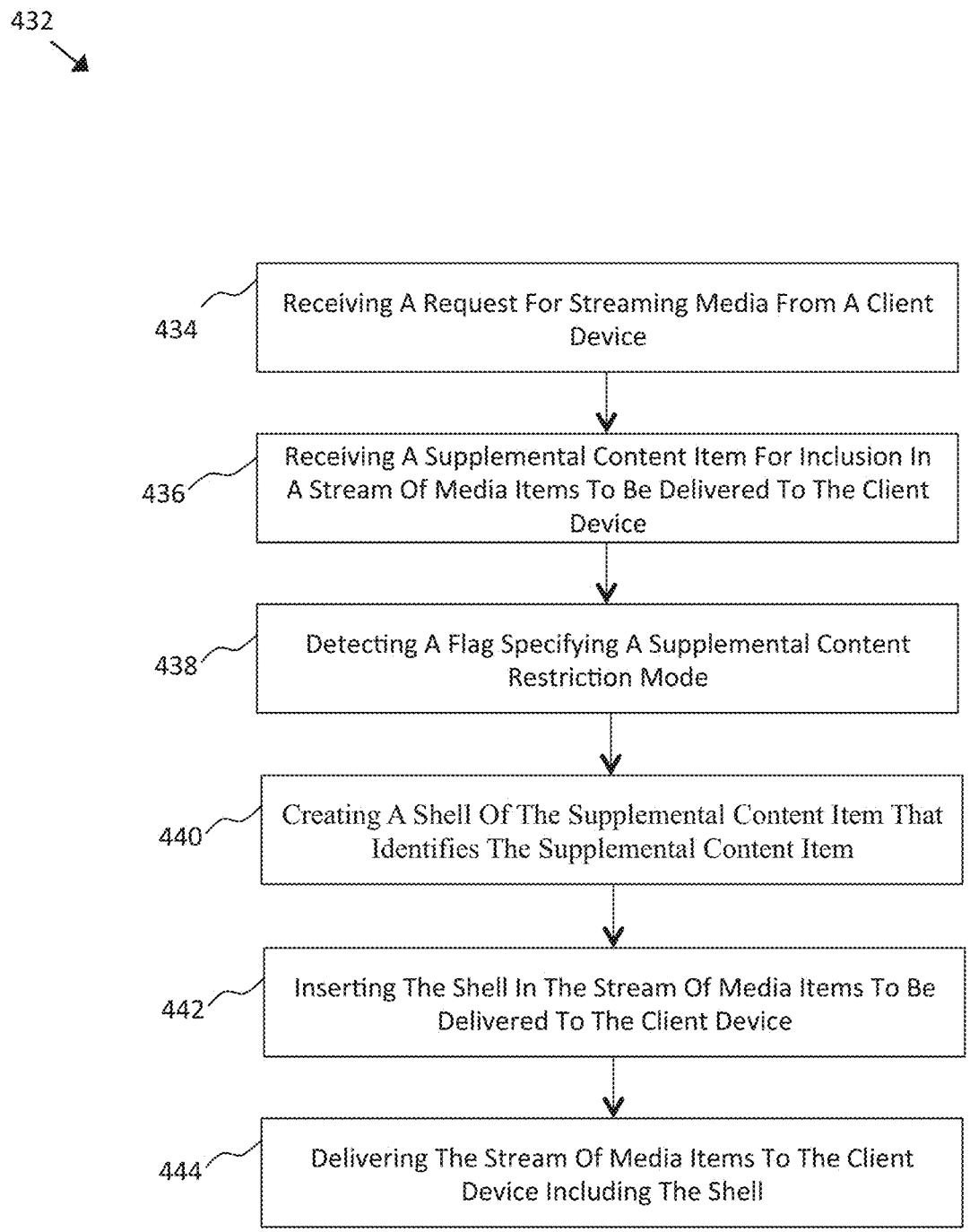
FIG. 4B illustrates a method of creating a shell of a supplemental content item for delivery to a client device in a stream of media items instead of the actual supplemental content item when a user of the client device specifies a supplemental content restriction mode according to some embodiments of the present technology.

FIG. 4B illustrates a method 432 of creating a shell of a supplemental content item for delivery to a client device in a stream of media items instead of the actual supplemental content item when a user of the client device specifies a supplemental content restriction mode according to some embodiments of the present technology.

The method 432 can involve receiving a request for streaming media from a client device 434. For example, a user can enter one or more user input on a user interface of a client device to request streaming media.

Also, the method 432 can involve receiving a supplemental content item for inclusion in a stream of media items to be delivered to the client device 436. The supplemental content item can be received from a supplemental content application on the client device, from a supplemental content policy engine, from the supplemental content server, etc.

Next, the method 432 involves detecting, in response to the request for streaming media, a flag specifying a restriction mode 438. For example, a client device can send a flag to the server via the request for streaming media. Also, a media streaming server can inspect a database on the client device for flags and detect a flag indicating that the client device received one or more inputs corresponding to a user request to enter a temporary restriction mode on the client device.

In response to detecting a flag, the method 432 can involve creating a shell of the supplemental content item that identifies the supplemental content item 440, inserting the shell in the stream of media items to be delivered to the client device 442, and delivering the stream of media items to the client device including the shell 444 where the shell causes the client device to report a presentation event of the supplemental content item when detected in the stream of media items at the client device without interrupting playback of the stream of media items at the client device.

In some embodiments of the present technology, the supplemental content shell also identifies price of the foregone supplemental content. The supplemental content server, the media platform, and/or the supplemental content policy engine can serve the shell to the client instead of the actual supplemental content. The shell can them be used for billing the user, forecasting required supplemental content inventory, analyzing a supplemental content campaign, etc.

Figure 4C:
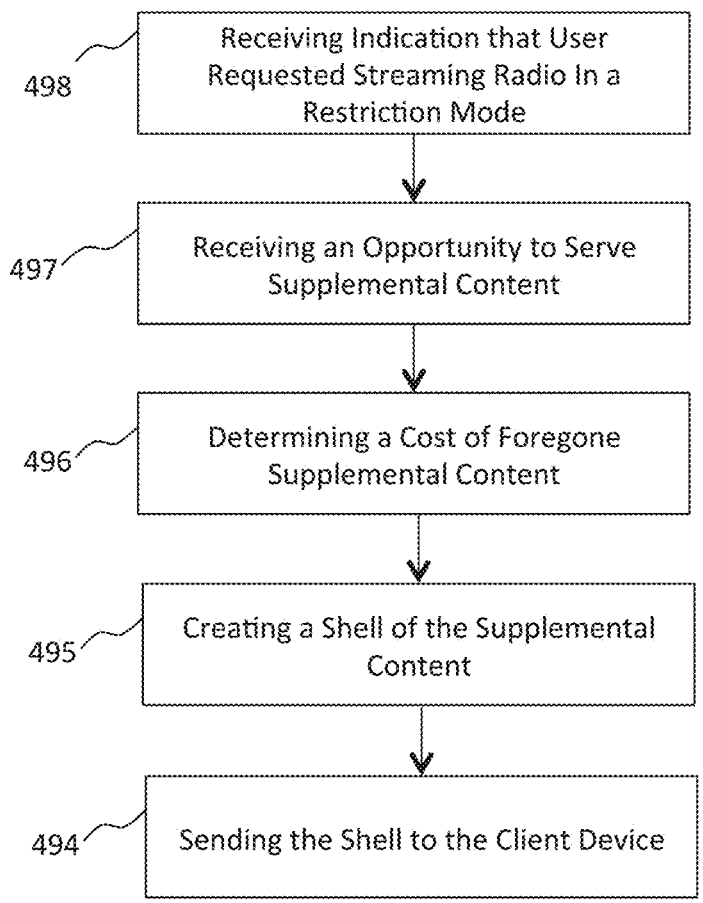
FIG. 4C illustrates an example of a method or creating a shell of a supplemental content item according to some embodiments of the present technology.

FIG. 4C illustrates an example of a method 499 for creating a shell of a supplemental content item according to some embodiments of the present technology. FIG. 4C describes the method 499 in the context of a media-streaming application; however, the method 499 can be used in a wide variety of applications. The method 499 involves a supplemental content server receiving an indication that a user has requested streaming radio in a restriction mode 498. This can further involve determining the time period of the supplemental content restriction mode, a maximum cost before expiration, a maximum number of supplemental content slots, etc. Next, the supplemental content server receives, from a supplemental content server and/or policy engine, an opportunity to serve supplemental content to the user 497.

The supplemental content server can determine the cost of the supplemental content that will be foregone 496 and creates a supplemental content shell 495. The supplemental content shell can be data file, an encoded signal, etc. that describes the supplemental content and the cost that is foregone by not serving the supplemental content to the client. The method can also involve sending the shell of the supplemental content to the client 494 for billing the user, forecasting required supplemental content inventory, analyzing a supplemental content campaign, etc.

Figure 4D:
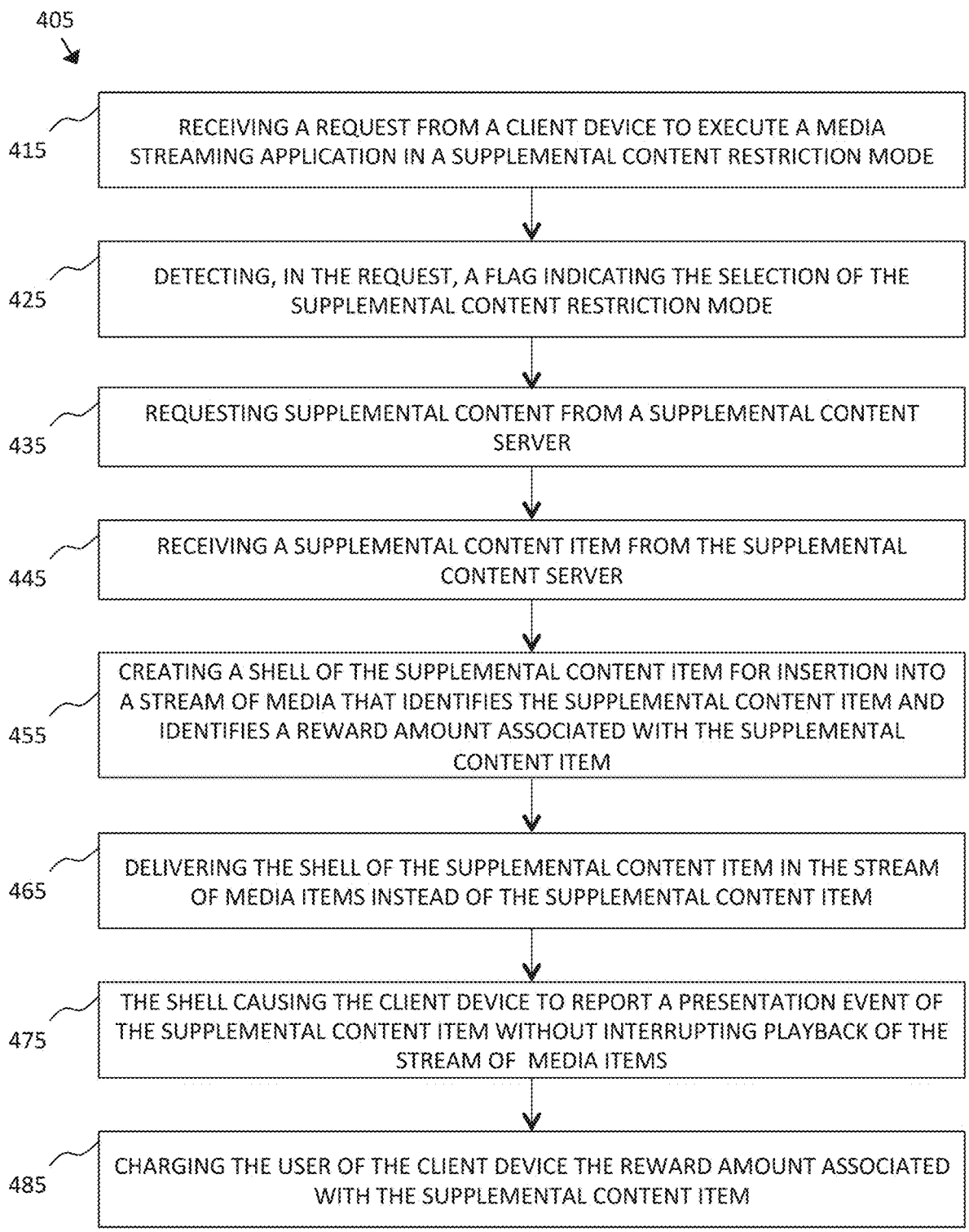
FIG. 4D illustrates an example of a method for delivering a shell of a supplemental content item to a client device in a stream of media items and causing the client device to report a presentation event without interrupting playback of the stream of media items according to some embodiments of the present technology.

FIG. 4D illustrates an example of a method 405 for delivering a shell of a supplemental content item to a client device in a stream of media items and causing the client device to report a presentation event without interrupting playback of the stream of media items according to some embodiments of the present technology. The method 405 involves receiving a request from a client device to execute a media streaming application in a supplemental content restriction mode 415 and detecting, in the request, a flag indicating the selection of the supplemental content restriction mode 425.

Next, the method 405 involves requesting supplemental content from a supplemental content server 435 and receiving a supplemental content item from the supplemental content server 445. Based on the flag indicating the selection of the supplemental content restriction mode, the method 405 involves creating a shell of the supplemental content item for insertion into a stream of media 455 that identifies the supplemental content item and identifies a reward amount associated with the supplemental content item.

Next, in response to the request from the client device, the method 405 involves delivering the shell of the supplemental content item in the stream of media items instead of the supplemental content item 465 and the shell causing the client device to report a presentation event without interrupting playback of the stream of media items 475.

Finally, the method 405 involves charging the user of the client device the reward amount associated with the supplemental content item 485.

A media platform can distribute a variety of services to the client device and can host third party applications that provide services. For example, the media platform can offer a streaming music service and can host a variety of applications developed by third parties and distributed through the media platform. Additionally, the streaming music service, content providers, and the third party developers can be rewarded by the supplemental content providers when they deliver supplemental content to the client devices along with the streaming music, applications, etc. In some cases the subscription service for allowing a user to customize the amount of supplemental content that they are delivered involves a paid subscription service and a portion of the payment can be given to the streaming music service, content providers, and third party developers, etc. as the reward. However, when the client device is in a temporary mode for customizing the amount of supplemental content they receive, the reward is calculated based on the value of the supplemental content and how much supplemental content is foregone due to the temporary supplemental content restriction mode.

Figure 5A:
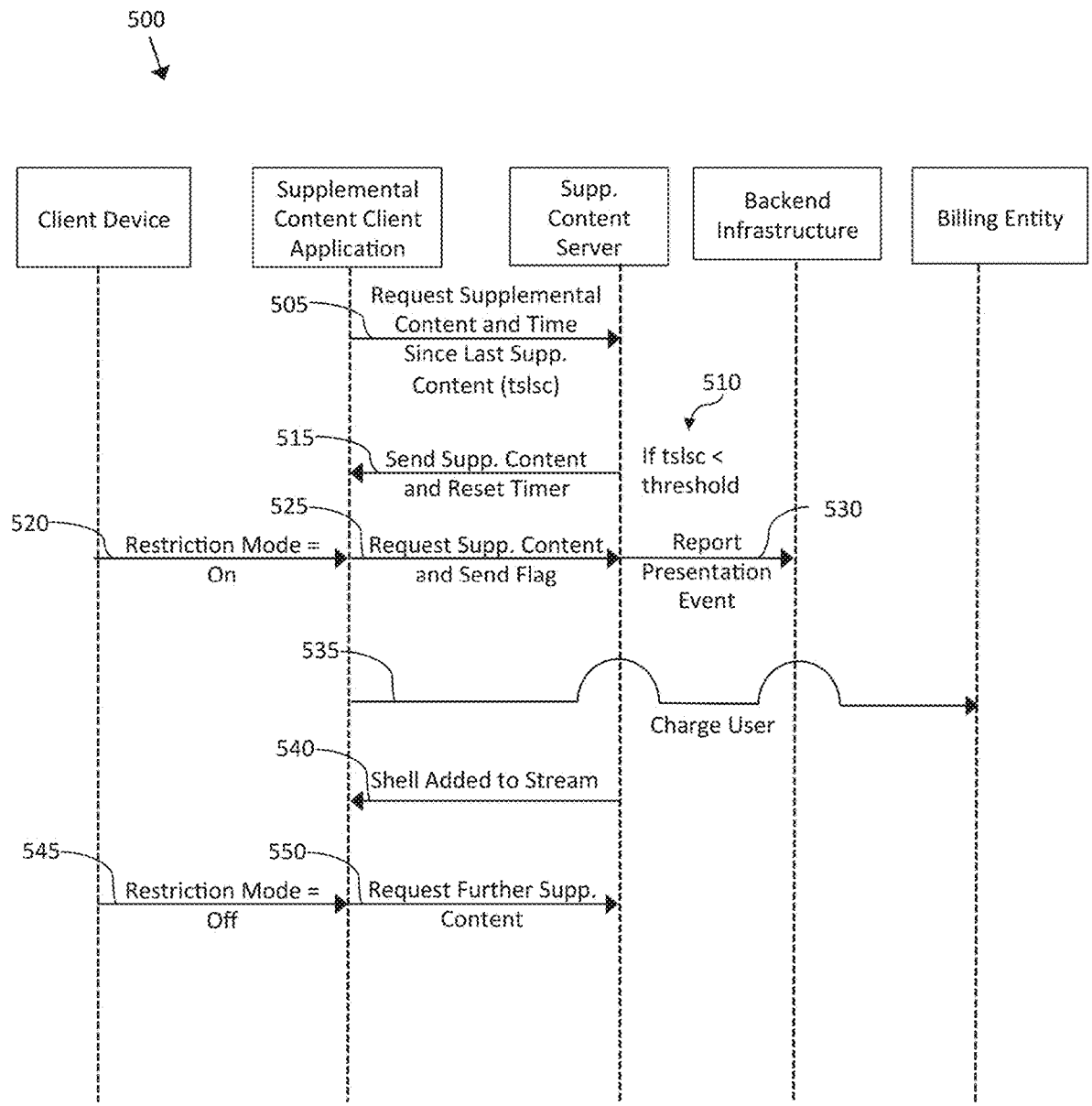
FIG. 5A illustrates a method of charging a user for the cost of a reward that would otherwise be paid in the restriction mode according to some embodiments of the present technology.

FIG. 5A illustrates a method 500 of charging a user for the cost of a reward that would otherwise be paid by supplemental content provider if the user were not in a temporary supplemental content restriction mode according to some embodiments of the present technology. The method 500 involves a user consuming media content on a device with a supplemental content client application that is configured to request supplemental content and receive the same from one or more supplemental content server. The method 500 involves the supplemental content client application requesting supplemental content from a supplemental content server and listening for a response 505. The supplemental content server can also enforce a rule that avoids providing supplemental content too frequently. As shown, the method 500 involves determining if time since the last supplemental content ("tslsc") delivery is greater than a pre-defined threshold 510. When the time since the last supplemental content is greater than the pre-defined threshold, the supplemental content server delivers supplemental content to the supplemental content client application re-sets a timer 515.

Next, the supplemental content client application receives an indication from a media application that a restriction mode is active 520 before requesting further supplemental content with a flag indicating that a supplemental content restriction mode is active 525. Next, the supplemental content server sends a backend user infrastructure a report that a presentation event occurred 530 while the actual supplemental content item is not actually presented to the user. This report can be a log of what supplemental content is forgone, an amount of a reward that is associated with the foregone content, etc. The supplemental content server can use the log to send to a billing entity and charge the user 535 for the supplemental content that was foregone by the supplemental content restriction mode being active.

Additionally, a shell is added to the stream of media items while the supplemental content is not served, a cost of the foregone supplemental content is reported to the user, and the timer is reset 540. The cost can be used on the client device to determine how long the restriction mode should remain in place. When the restriction mode ends, the supplemental content client can receive a flag from a user that the restriction mode is no longer active 545 before requesting further supplemental content 550.

Figure 5B:
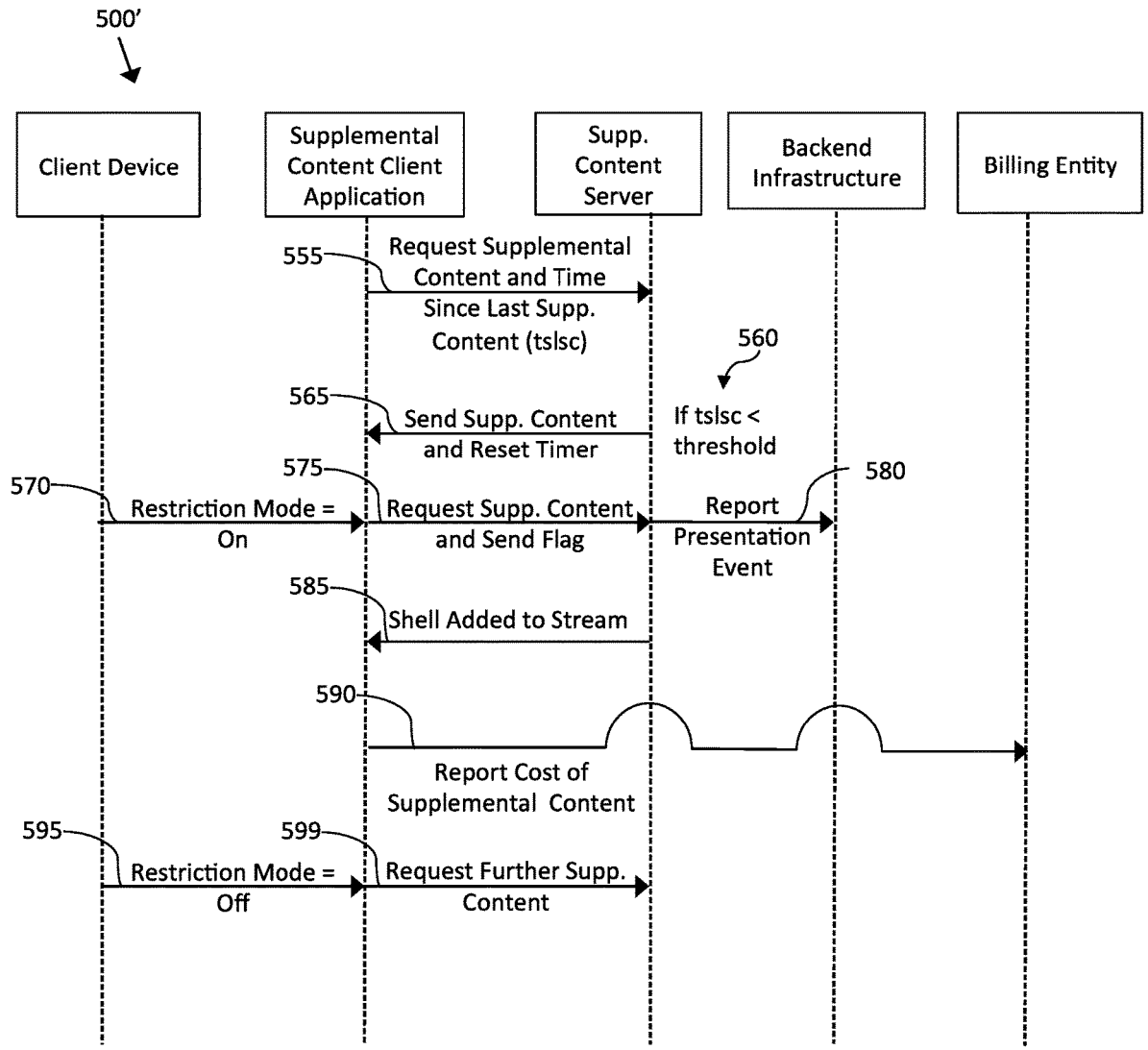
FIG. 5B illustrates an alternative method of charging a user for the cost of a reward that would otherwise be paid in the restriction mode according to some embodiments of the present technology.

FIG. 5B illustrates an alternative method 500' of charging a user for the cost of a reward that would otherwise be paid by supplemental content provider if the user were not in a restriction mode according to some embodiments of the present technology. The method 500' involves a user consuming media content on a device with a supplemental content client application that is configured to request supplemental content and receive the same from one or more supplemental content server. The method 500 involves the supplemental content client application requesting supplemental content from a supplemental content server and listening for a response 555, determining that the time since the last supplemental content ("tslsc") delivery is greater than a pre-defined threshold 560, and delivering supplemental content to the supplemental content client application re-sets a timer 565.

Next, the supplemental content client receives an indication from a user that a restriction mode is active 570 before requesting further supplemental content with a flag indicating that a supplemental content restriction mode is active 575. Next, the supplemental content server reports a presentation event to a backend user infrastructure that the supplemental content was shown 580. However, instead of the supplemental content, a shell is added to the media stream, a cost of the foregone supplemental content is reported to the user and the timer is reset 585.

Additionally, the method 500' can involve the supplemental content client itself reporting the cost of foregoing the supplemental content 590. Subsequently, the supplemental content client receives a flag from the user indicating that the restriction mode is no longer active 595 before requesting further supplemental content 599.

The present technology can also be applied to multiple devices associated with a user profile. For example, multiple devices can be associated with a user identifier for a user profile and when a user chooses to enter a temporary supplemental content restriction mode on a first device associated with a user identifier, the user can enter a restriction mode on a second device associated with the user identifier.

In some embodiments of the present technology, a restriction mode can involve foregoing all supplemental content. In some other embodiments, the temporary supplemental content customization mode can involve reducing the amount of supplemental content provided to a client, can involve frontloading a block of supplemental content before a block of supplemental content restriction media, etc.

In some embodiments of the present technology, a restriction mode can be used to select an option that allows a supplemental content provider to sponsor, e.g. through a single introductory bumper before supplemental content restriction playback. The supplemental content sponsorship campaign also includes a supplemental content inventory that is far lower in volume. This option allows the initial supplemental campaign to change its mode based on the user action which is beneficial as typical sponsorships cost a lot more and this options allows a regular standard media campaign to act as a sponsorship with all its perks, but with a somewhat lower volume of supplemental content. The supplemental content providers will continue to count available supply and thus forecast on its available as normal since there is no change in the methodology for delivering supplemental content.

Figure 6A:
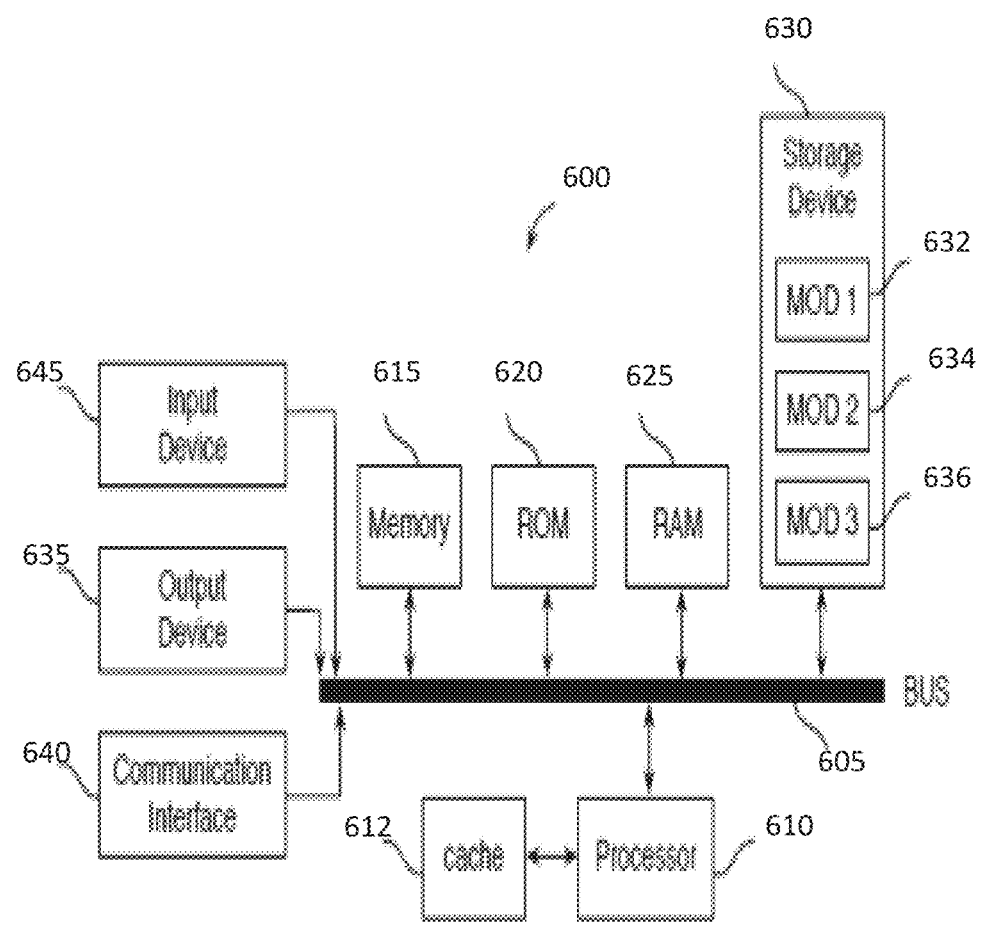
FIG. 6A and FIG. 6B illustrate exemplary possible system embodiments.
Figure 6B:
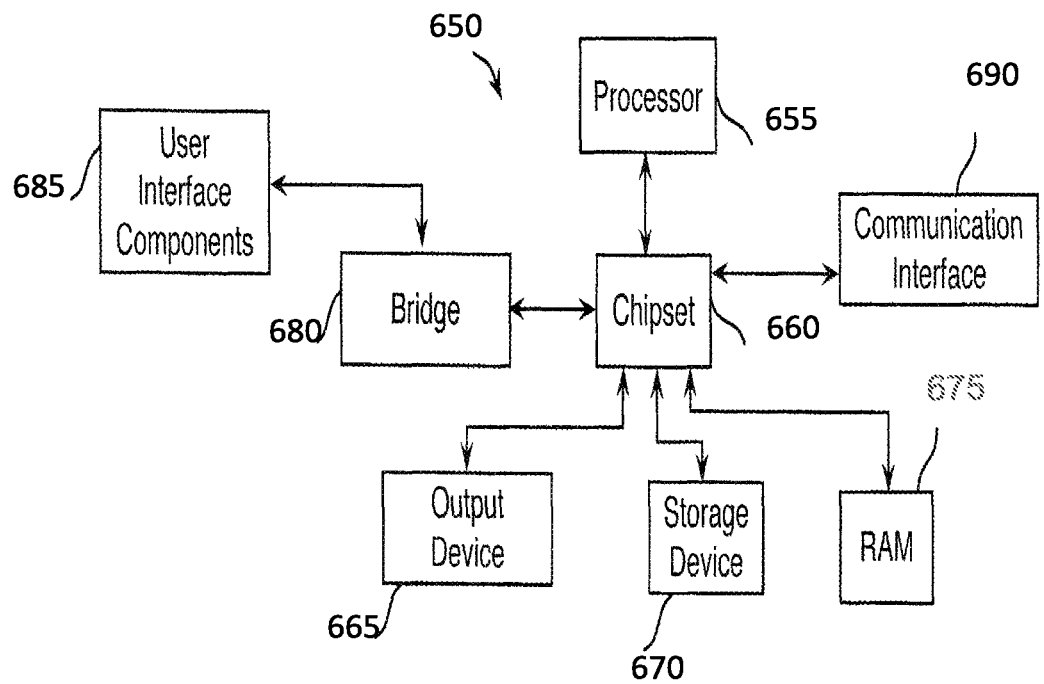

FIG. 6A and FIG. 6B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
   receiving, from a client device at a server, a request for media items;
   detecting, in the request, metadata specifying a restriction mode for the client device;
   based on the restriction mode, inserting a shell in the media items to be delivered to the client device, the shell including a reference to at least one supplemental media item; and
   delivering the media items and the shell including the reference to the at least one supplemental media item to the client device,
   wherein in response to detection of the shell during playback of the media items, at the client device, playback of the media items is not interrupted.

2. The computer-implemented method of claim 1, wherein the restriction mode delivers the media items without presenting the at least one supplemental media items for a predetermined period of time.

3. The computer-implemented method of claim 1, further comprising
   in response to detection of the shell during playback of the media items, receiving notice of the detection of the shell.

4. The computer-implemented method of claim 1, wherein the media items are delivered to the client device via streaming.

5. The computer-implemented method of claim 1, wherein the restriction mode is a temporary restriction mode.

6. The computer-implemented method of claim 1, further comprising a second client device associated with a user account of the client device, wherein the second client device is configured in the restrictive mode, the method further comprising delivering the media items and the shell referencing the at least one supplemental item to the second client device.

7. The computer-implemented method of claim 1, wherein the shell further identifies a reward amount associated with the at least one supplemental media items.

8. The computer-implemented method of claim 7, further comprising:
   charging the client device the reward amount associated with the at least one supplemental media item.

9. A system comprising:
   at least one processor; and
   at least on memory storing instructions which when exectued by the at least one processor causes the at least one processor to:
   receive, from a client device, a request for media items;

detect, in the request, metadata specifying a restriction mode for the client device;

based on the restriction mode, insert a shell in the media items to be delivered to the client device, the shell including a reference to at least one supplemental media item; and deliver the media items and the shell including the reference to the at least one supplemental media item to the client device, wherein in response to detection of the shell during playback of the media items, at the client device, playback of the media items is not interrupted.

10. The system of claim 9, wherein the restriction mode delivers the media items without presenting the at least one supplemental media items for a predetermined period of time.

11. The system of claim 9, wherein in response to detection of the shell during playback of the media items, receive notice of the detection of the shell.

12. The system of claim 9, wherein the media items are delivered to the client device via streaming.

13. The system of claim 9, wherein the restriction mode is a temporary restriction mode.

14. The system of claim 9, further comprising instructions which when executed by the at least one processor, causes the at least one processor to deliver the media items and the shell to a second client device, the a second client device associated with a user account of the client device, wherein the second client device is configured in the restrictive mode.

15. The system of claim 9, wherein the shell further identifies a reward amount associated with the at least one supplemental media items.

16. The system of claim 15, further comprising instructions which when executed by the at least one processor, causes the at least one processor to charge the client device the reward amount associated with the at least one supplemental media item.

17. At least one non-transitory computer readable medium storing instructions which when exectued by at least one processor causes the at least one processor to:

receive, from a client device, a request for media items;

detect, in the request, metadata specifying a restriction mode for the client device;

based on the restriction mode, insert a shell in the media items to be delivered to the client device, the shell including a reference to at least one supplemental media item; and and deliver the media items and the shell including the reference to the at least one supplemental media item to the client device, wherein in response to detection of the shell during playback of the media items, at the client device, playback of the media items is not interrupted.

18. The at least one non-transitory computer readable medium of claim 17, wherein the restriction mode delivers the media items without presenting the at least one supplemental media items for a predetermined period of time.

19. The at least one non-transitory computer readable medium of claim 17, wherein in response to detection of the shell during playback of the media items, receiving notice of the detection of the shell.

20. The at least one non-transitory computer readable medium of claim 17, wherein the media items are delivered to the client device via streaming.

21. The at least one non-transitory computer readable medium of claim 17, wherein the restriction mode is a temporary restriction mode.

22. The at least one non-transitory computer readable medium of claim 17, further comprising instructions which when executed by the at least one processor, causes the at least one processor to deliver the media items and the shell to a second client device, the a second client device associated with a user account of the client device, wherein the second client device is configured in the restriction mode.

23. The at least one non-transitory computer readable medium of claim 17, wherein the shell further identifies a reward amount associated with the at least one supplemental media items.

24. The at least one non-transitory computer readable medium of claim 17, further comprising instructions which when executed by the at least one processor, causes the at least one processor to charge the client device the reward amount associated with the at least one supplemental media item.

25. The computer implemented method of claim 1, further comprising:

detecting the metadata specifying the restriciton mode for the client device is not active;

based on the restriction mode not being active, determining at least one supplemental media item for inclusion wtih the media items to be delivered to the client device;

inserting the media items to be delivered to the client device; and delivering the media items and the at least one supplemental media item to the client device.

26. The system of claim 9, further comprising instructions which when executed by the at least one processor causes the at least one processor to:

detect the metadata specifying the restriction mode for the client device is not active;

based on the restriction mode not being active, determine at least one supplemental media item for inclusion with the media items to be delivered to the client device;

insert the media items to be delivered to the client device; and deliver the meida items and the at least one supplemental media item to the client device.

27. The at least one non-transitory computer readable medium of claim 9, further comprising instructions which when executed by the at least one processor causes the at least one processor to:

detect the metadata specifying no restriciton mode for the client device is not active;

based on the restriction mode not being active, determine at least one supplemental media item for inclusion with the media items to be delivered to the client device;

insert the media items to be delivered to the client device; and deliver the media items and the at least one supplemental media item to the client device.

* * * * *